United States Patent
Chang et al.

(10) Patent No.: US 11,309,784 B2
(45) Date of Patent: Apr. 19, 2022

(54) POWER CONVERSION CIRCUIT WITH MULTI-FUNCTIONAL PIN AND MULTI-FUNCTION SETTING METHOD THEREOF

(71) Applicant: uPI Semiconductor Corp., Hsinchu County (TW)

(72) Inventors: Chih-Lien Chang, Hsinchu County (TW); Chun-Chieh Wang, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 73 days.

(21) Appl. No.: 16/992,065

(22) Filed: Aug. 12, 2020

(65) Prior Publication Data
US 2021/0111625 A1 Apr. 15, 2021

(30) Foreign Application Priority Data
Oct. 14, 2019 (CN) .......................... 201910974579.4

(51) Int. Cl.
*H02M 1/00* (2006.01)
*H02M 3/155* (2006.01)

(52) U.S. Cl.
CPC ........... *H02M 1/0058* (2021.05); *H02M 1/00* (2013.01); *H02M 3/155* (2013.01)

(58) Field of Classification Search
CPC ....... H02M 1/00; H02M 1/0058; H02M 3/155
USPC ......................................................... 307/31
See application file for complete search history.

(56) References Cited

U.S. PATENT DOCUMENTS

| | | | |
|---|---|---|---|
| 7,061,215 B2 | 6/2006 | Harris | |
| 7,339,359 B2 | 3/2008 | Choi et al. | |
| 7,514,992 B2 | 4/2009 | Dequina et al. | |
| 7,795,846 B2 | 9/2010 | Martin | |
| 7,855,903 B2 | 12/2010 | Khayat et al. | |
| 8,102,679 B2 | 1/2012 | Gong et al. | |
| 8,816,746 B2 | 8/2014 | Wen et al. | |
| 8,988,902 B2 | 3/2015 | Gao et al. | |
| 2006/0209581 A1* | 9/2006 | Choi ................. | H02M 3/33523 363/120 |

(Continued)

*Primary Examiner* — William Hernandez
(74) *Attorney, Agent, or Firm* — JCIPRNET

(57) ABSTRACT

The disclosure provides a power conversion circuit with a multi-function pin and a multi-function setting method thereof. The multi-function pin is coupled to an external setting circuit. The power conversion circuit includes a first function circuit, a second function circuit, and a judging circuit. The first function circuit is coupled to the multi-function pin. The second function circuit is coupled to the multi-function pin. The judging circuit is coupled to the multi-function pin, the first function circuit, and the second function circuit. The judging circuit provides a setting current to the multi-function pin, so that the external setting circuit generates a voltage according to the setting current. The judging circuit judges the type of external setting circuit according to voltage so as to activate the first function circuit or the second function circuit accordingly. The disclosure also provides a multi-function setting method in which the power conversion circuit automatically activates the corresponding function according to the type of external setting circuit.

10 Claims, 4 Drawing Sheets

(56) References Cited

U.S. PATENT DOCUMENTS

| | | | | |
|---|---|---|---|---|
| 2010/0124084 A1* | 5/2010 | Chang | ............ | H02M 1/32 |
| | | | | 363/95 |
| 2011/0032024 A1* | 2/2011 | Chen | ............ | H05B 45/3725 |
| | | | | 327/524 |
| 2012/0112816 A1* | 5/2012 | Wang | ............ | G06F 1/22 |
| | | | | 327/427 |
| 2013/0121044 A1* | 5/2013 | Gao | ............ | H02M 3/33523 |
| | | | | 363/50 |
| 2014/0328087 A1* | 11/2014 | Tang | ............ | H02M 3/156 |
| | | | | 363/21.01 |

* cited by examiner

POWER CONVERSION CIRCUIT WITH MULTI-FUNCTIONAL PIN AND MULTI-FUNCTION SETTING METHOD THEREOF

This application claims the priority benefit of China application serial no. 201910974579.4, filed on Oct. 14, 2019. The entirety of the above-mentioned patent application is hereby incorporated by reference herein and made a part of this specification.

BACKGROUND

1. Technical Field

The disclosure relates to a power conversion circuit, in particular to a power conversion circuit with a multi-function pin and a multi-function setting method thereof.

2. Description of Related Art

In the power conversion circuit architecture, because the number of integrated circuit pins is limited, the function setting pins must be shared with other pins. However, with the increasing demand for power conversion circuits, the existing pins are no longer sufficient. In particular, the existing multi-function pins may only receive corresponding voltage by coupling an external resistor so as to set the parameters of the internal circuit, which further limits the choice of pins. For example, a soft-start pin of the power conversion circuit needs to be coupled to an external capacitor for soft-start, and is therefore unable to be used as a multi-function pin coupled to an external resistor for other function settings. In view of this, the solutions are proposed in several embodiments below.

SUMMARY

The disclosure is directed to a power conversion circuit with a multi-function pin and a multi-function setting method thereof, in which a corresponding function can be activated according to the type of an external setting circuit.

According to an embodiment of the disclosure, a multi-function pin of a power conversion circuit of the disclosure is coupled to an external setting circuit. The power conversion circuit includes a first function circuit, a second function circuit, and a judging circuit. The first function circuit is coupled to the multi-function pin. The second function circuit is coupled to the multi-function pin. The judging circuit is coupled to the multi-function pin, the first function circuit, and the second function circuit. The judging circuit provides a setting current to the multi-function pin so that the external setting circuit generates a voltage according to the setting current. The judging circuit judges the type of external setting circuit according to voltage, so as to activate the first function circuit or the second function circuit accordingly.

According to an embodiment of the disclosure, the external setting circuit is one of a resistor or a capacitor.

According to an embodiment of the disclosure, the setting current continues for a first time and generates the voltage at the multi-function pin at the end of the first time during a soft-start period.

According to an embodiment of the disclosure, the first function circuit includes a first current source and a soft-start circuit. The first current source is coupled to the multi-function pin, and the soft-start circuit is coupled to the multi-function pin. The judging circuit activates the first function circuit it judges that the external setting circuit is a capacitor, so that the first current source provides a first reference current to the multi-function pin, the external setting circuit generates a soft-start voltage according to the first reference current to be provided to the soft-start circuit through the multi-function pin, and the soft-start circuit performs soft-start according to the soft-start voltage.

According to an embodiment of the disclosure, the second function circuit includes a first sub-function circuit and a second sub-function circuit. The first sub-function circuit and the second sub-function circuit are coupled to the multi-function pin. The judging circuit activates the second function circuit when it judges that the external setting circuit is a resistor, so that the first sub-function circuit performs a soft-start setting, the second sub-function circuit provides a second reference current to the multi-function pin, and the external setting circuit generates a setting voltage according to the second reference current, so that the power conversion circuit performs a multi-function setting according to the setting voltage.

According to an embodiment of the disclosure, the judging circuit includes a second current source and a comparator. The second current source is coupled to the multi-function pin and configured to provide the setting current. A non-inverting input end of the comparator is coupled to the multi-function pin, an inverting input end of the comparator is coupled to a reference voltage, and an output end of the comparator is coupled to the first function circuit and the second function circuit. The second current source outputs the setting current to the multi-function pin during a judging period, so that the external setting circuit provides the voltage to the multi-function pin according to the setting current, and the comparator compares the voltage and the reference voltage so as to output a comparison signal.

According to an embodiment of the disclosure, a multi-function setting method for a power conversion circuit of the disclosure is applied to the power conversion circuit having a multi-function pin coupled to an external setting circuit. The multi-function setting method includes: providing a setting current to the multi-function pin, so that the external setting circuit generates a voltage according to the setting current; and judging the type of the external setting circuit according to the voltage to activate a first function circuit or a second function circuit accordingly.

According to an embodiment of the disclosure, in a step of providing the setting current to the multi-function pin, the setting current continues for a first time, and the voltage is compared with a reference voltage at the end of the first time.

According to an embodiment of the disclosure, a step of judging the type of the external setting circuit according to the voltage so as to correspondingly activate the first function circuit or the second function circuit includes: activating the first function circuit when the external setting circuit is judged to be a capacitor, so that the first function circuit provides a first reference current to the multi-function pin; and generating a soft-start voltage according to the first reference current through the external setting circuit so as to perform soft-start according to the soft-start voltage.

According to an embodiment of the disclosure, a step of judging the type of the external setting circuit according to the voltage so as to correspondingly activate the first function circuit or the second function circuit includes: activating the second function circuit when the external setting circuit is judged to be a resistor, so that a first sub-function circuit of the second function circuit performs a soft-start setting, and a second sub-function circuit of the second function circuit provides a second reference current to the multi-function pin; and generating a setting voltage according to the second reference current through the external setting circuit, where the power conversion circuit performs a multi-function setting according to the setting voltage.

Based on the above, the power conversion circuit having a multi-function pin and the multi-function setting method thereof of the disclosure can automatically decide the type of the external setting circuit, so as to perform soft-start or other function settings accordingly.

In order to make the above features and advantages of the disclosure more obvious and understandable, the embodiments are specifically described below in conjunction with the drawings for detailed description as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
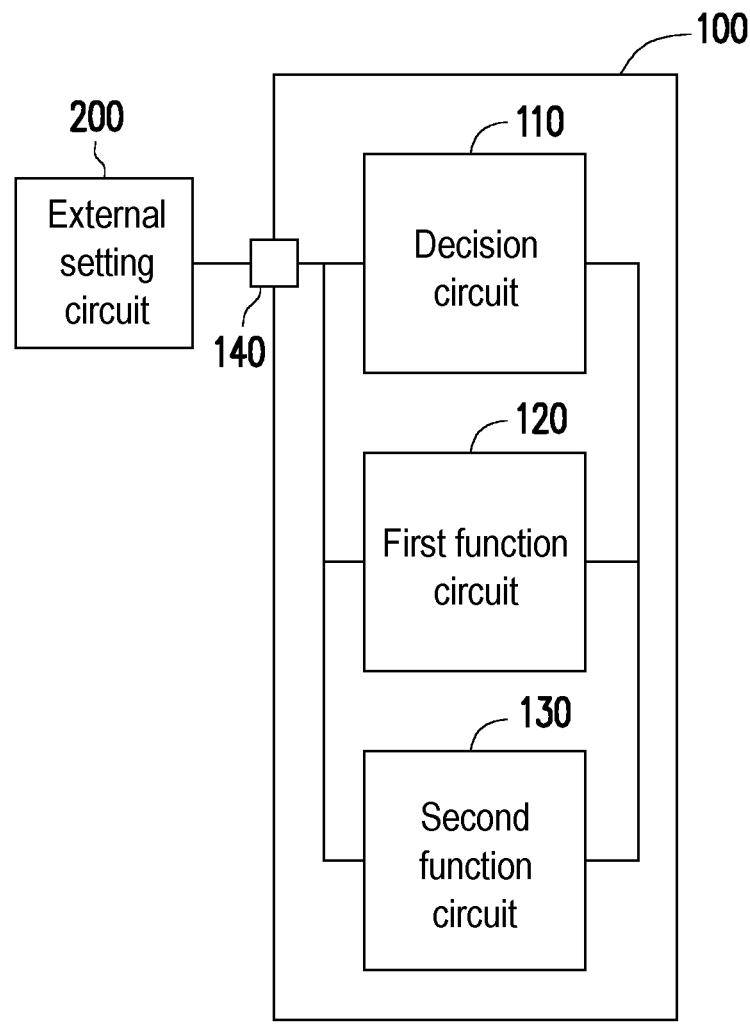
FIG. 1 is a schematic block diagram of a power conversion circuit according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a schematic block diagram of a power conversion circuit according to n embodiment of the disclosure. Referring to FIG. 1, a power conversion circuit 100 includes a judging circuit 110, a first function circuit 120, a second function circuit 130, and a multi-function pin 140. The judging circuit 110 is coupled to the first function circuit 120, the second function circuit 130, and the multi-function pin 140. The first function circuit 120 and the second function circuit 130 are coupled to the multi-function pin 140. In the present embodiment, the power conversion circuit 100 is coupled to an external setting circuit 200 through the multi-function pin 140. When the power conversion circuit 100 is activated, the judging circuit 110 provides a setting current to the multi-function pin 140, so that the external setting circuit 200 generates a corresponding voltage according to the setting current. Then, the judging circuit 110 can decide the type of the external setting circuit 200 according to the corresponding voltage returned by the external setting circuit 200 through the multi-function pin 140, so as to activate the first function circuit 120 or the second function circuit 130 accordingly. Therefore, the power conversion circuit 100 of the present embodiment can automatically decide the type of the external setting circuit 200 externally coupled to the multi-function pin 140, so as to activate the corresponding function. From another perspective, a user may selectively couple a specific external setting circuit 200 to the multi-function pin 140 of the power conversion circuit 100 of the present embodiment according to a specific function of the power conversion circuit 100 he or she wishes to activate, so that the power conversion circuit 100 of the present embodiment automatically judges the type of the external setting circuit 200 and activates the specific function.

In the present embodiment, the first function circuit 120 may include, for example, a soft-start circuit, and the second function circuit 130 may include, for example, a first sub-function circuit and a second sub-function circuit. The external setting circuit 200 is selectively one of a capacitor or a resistor. Taking the external setting circuit 200 as a capacitor for example, when the judging circuit 110 judges that the external setting circuit 200 is a capacitor, the judging circuit 110 activates the first function circuit 120, and the soft-start circuit of the first function circuit 120 performs soft-start according to the voltage generated by the external setting circuit 200. In other words, when the external setting circuit 200 is a capacitor, the power conversion circuit 100 can perform soft-start through the external setting circuit 200. Taking the external setting circuit 200 as a resistor for example, the first sub-function circuit of the second function circuit 130 may be a soft-start setting circuit of the power conversion circuit 100; when the judging circuit 110 judges that the external setting circuit 200 is a resistor, the judging circuit 110 activates the second function circuit 130 to perform soft-start through built-in soft-start parameters. In addition, the second sub-function circuit of the second function circuit 130 provides a second reference current to the multi-function pin 140, so that the external setting circuit 200 generates a setting voltage according to the second reference current. Then, the multi-function pin 140 may return the setting voltage to the second sub-function circuit of the second function circuit 130, so that the second sub-function circuit further performs a multi-function setting of the power conversion circuit 100. In other words, when the external setting circuit 200 is a resistor, the power conversion circuit 100 can perform soft-start by the internal soft-start circuit, and can perform a multi-function setting of the power conversion circuit 100 by the external setting circuit 200.

Figure 2:
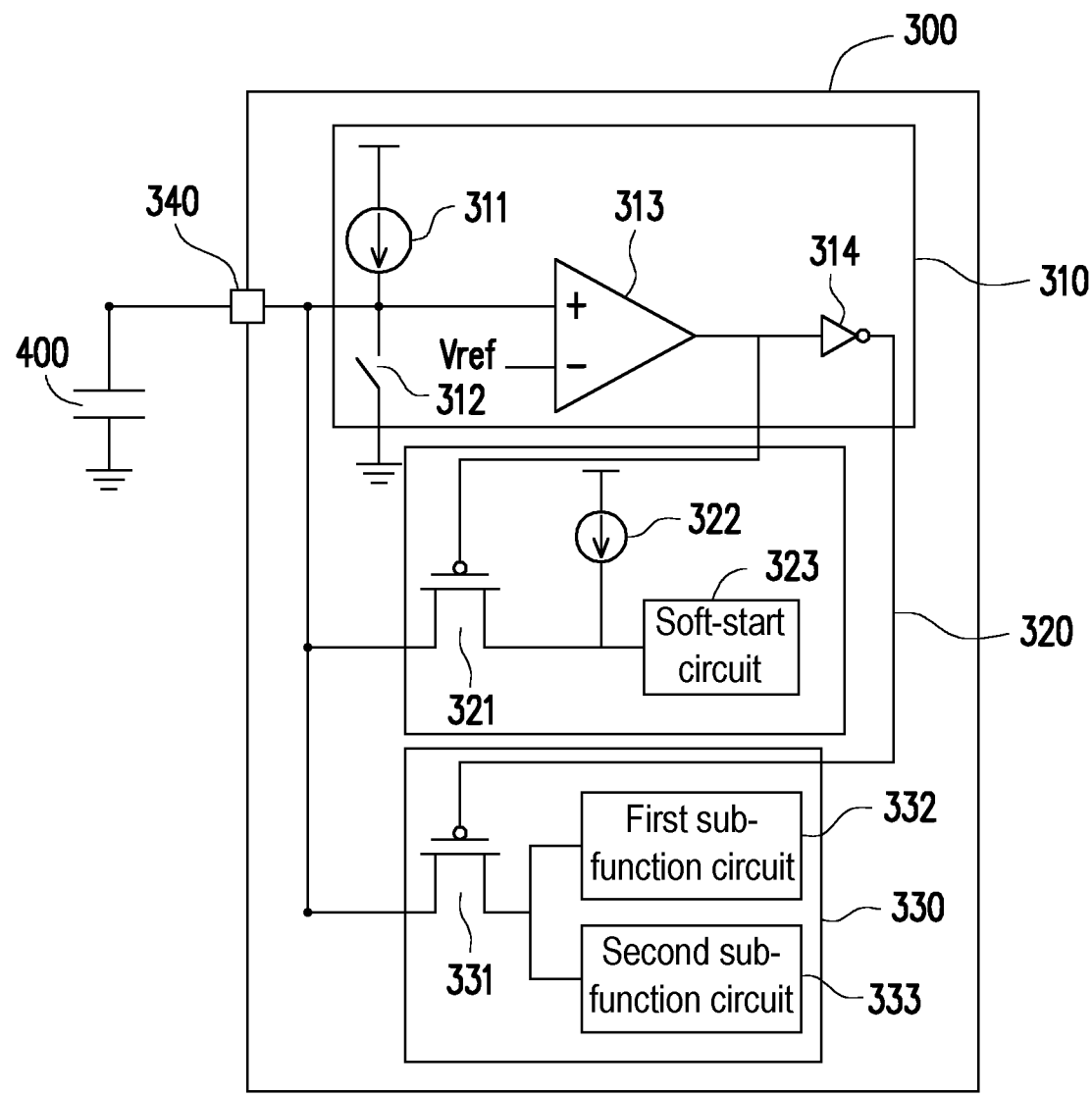
FIG. 2 is a schematic circuit diagram of a power conversion circuit according to an embodiment of the disclosure.

FIG. 2 is a schematic circuit diagram of a power conversion circuit according to an embodiment of the disclosure. Referring to FIG. 2, a power conversion circuit 300 includes a judging circuit 310, a first function circuit 320, a second function circuit 330, and a multi-function pin 340. The judging circuit 310 is coupled to the first function circuit 320, the second function circuit 330, and the multi-function pin 340. The first function circuit 320 and the second function circuit 330 are also coupled to the multi-function pin 340. The power conversion circuit 300 is coupled to a capacitor 400 through a multi-function pin 340. In the present embodiment, the judging circuit 310 includes a current source 311, a switch 312, a comparator 313, and an inverter 314. One end of the current source 311 is coupled to first input ends of the multi-function pin 340, the switch 312, and the comparator 313. A non-inverting input end of the comparator 313 is coupled to the current source 311 and the switch 312, and an inverting input end of the comparator 313 is coupled to a reference voltage Vref. An output end of the comparator 313 is coupled to an input end of the inverter 314. The input end of the inverter 314 is coupled to the first function circuit 320, and an output end of the inverter 314 is coupled to the second function circuit 330.

In the present embodiment, the first function circuit 320 includes a transistor switch 321, a current source 322, and a soft-start circuit 323. The transistor switch 321 is a P-type transistor. A first end of the transistor switch 321 is coupled to the multi-function pin 340, and a second end of the transistor switch 321 is coupled to the current source 322 and the soft-start circuit 323. A control end of the transistor switch 321 is coupled to the output end of the comparator 313. In the present embodiment, the second function circuit 330 includes a transistor switch 331, a first sub-function circuit 332, and a second sub-function circuit 333. The transistor switch 331 is a P-type transistor. A first end of the transistor switch 331 is coupled to the multi-function pin 340, and a second end of the transistor switch 331 is coupled to the first sub-function circuit 332 and the second sub-function circuit 333. A control end of the transistor switch 331 is coupled to the output end of the inverter 314.

Figures 4, 5:
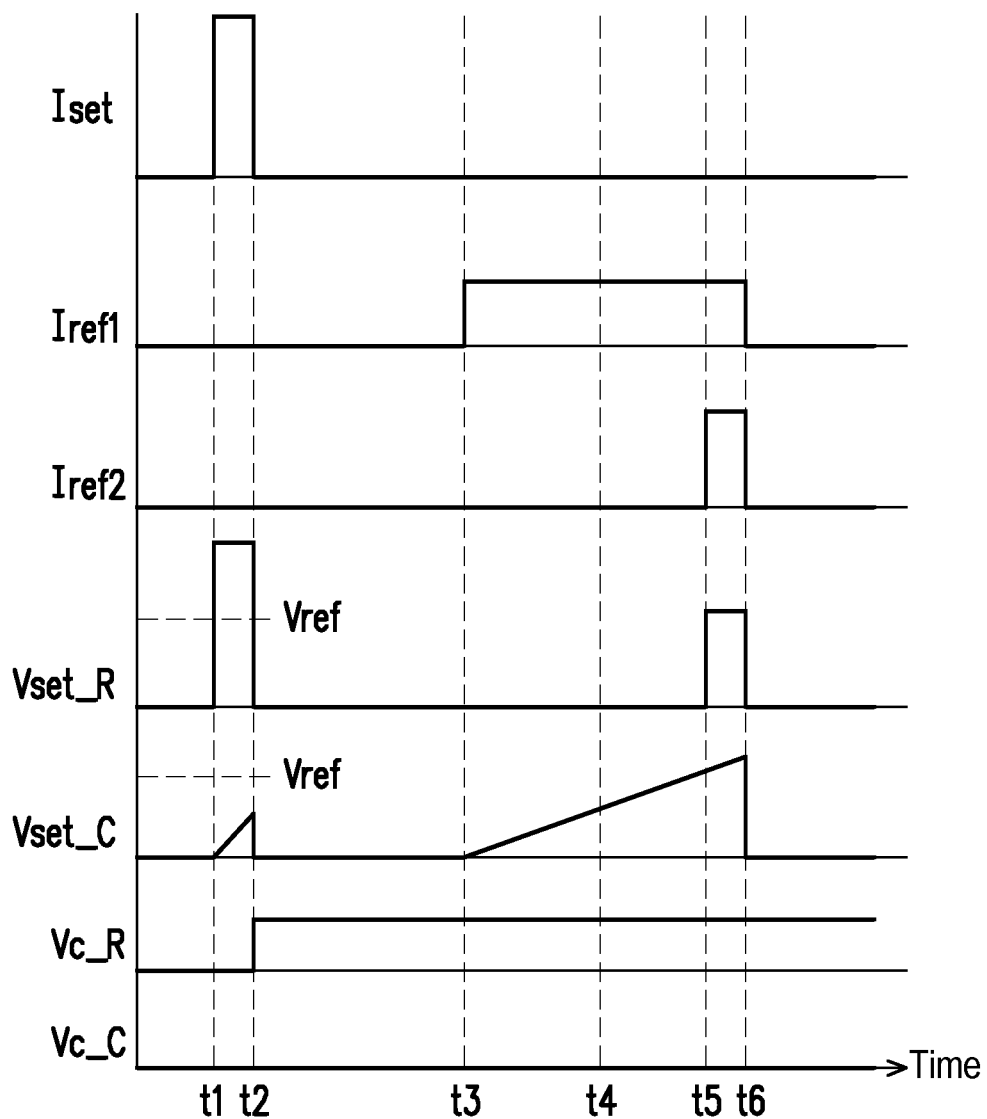
FIG. 4 is a signal waveform diagram of a power conversion circuit according to an embodiment of the disclosure.
FIG. 5 is a flowchart of a multi-function setting method according to an embodiment of the disclosure.

In the present embodiment, the capacitor 400 is used as the external setting circuit, and the power conversion circuit 300 is coupled to the capacitor 400 through the multi-function pin 340. Please refer to both FIG. 2 and FIG. 4. FIG. 4 is a signal waveform diagram of a power conversion circuit according to an embodiment of the disclosure. Also, FIG. 4 includes signal waveform changes when the capacitor 400 is used as the external setting circuit. In the present embodiment, before time t1, the transistor switch 312 of the judging circuit 310 is turned on to discharge the capacitor 400. Between time t1 and time t2, the transistor switch 312 is turned off and is not conductive. The current source 311 of the judging circuit 310 may provide a setting current (also called a pulse current) Iset to the multi-function pin 340. Then, after the capacitor 400 receives the setting current Iset through the multi-function pin 340, the capacitor 400 is charged to generate a corresponding voltage Vset_C, and the non-inverting input end of the comparator 313 receives the voltage Vset_C. After the capacitor 400 receives the setting current Iset having a fixed current value, a gradual voltage change occurs in response, as shown in FIG. 4. However, since a specific capacitance value may be selected for the capacitor 400 by a user so that the voltage Vset_C provided by the capacitor 400 is not higher than the reference voltage Vref, the output end of the comparator 313 outputs the output comparison signal Vc_C with a low voltage level to the control end of the transistor switch 321 of the first function circuit 320, so as to turn on the transistor switch 321. Also, after inverting the comparison signal via the inverter 314, the output end of the inverter 314 outputs another comparison signal with a high voltage level to the control end of the transistor switch 331 of the second function circuit 330, so as to turn off the transistor switch 331.

At time t3, since the transistor switch 321 of the first function circuit 320 is turned on, the current source 322 of the first function circuit 320 may provide a first reference current Iref1 to the multi-function pin 340 through the transistor switch 321, so that the multi-function pin 340 receives the first reference current Iref1. Then, after the capacitor 400 receives the first reference current Iref1 through the multi-function pin 340, the corresponding voltage Vset_C is generated at the multi-function pin 340. Therefore, as shown in FIG. 4, between time t3 and time t6, the voltage Vset_C gradually rises so that soft-start of the power conversion circuit 300 can be performed. Accordingly, in the present embodiment, the power conversion circuit 300 can automatically decide that the external setting circuit is the capacitor 400, and execute the corresponding soft-start.

Figure 3:
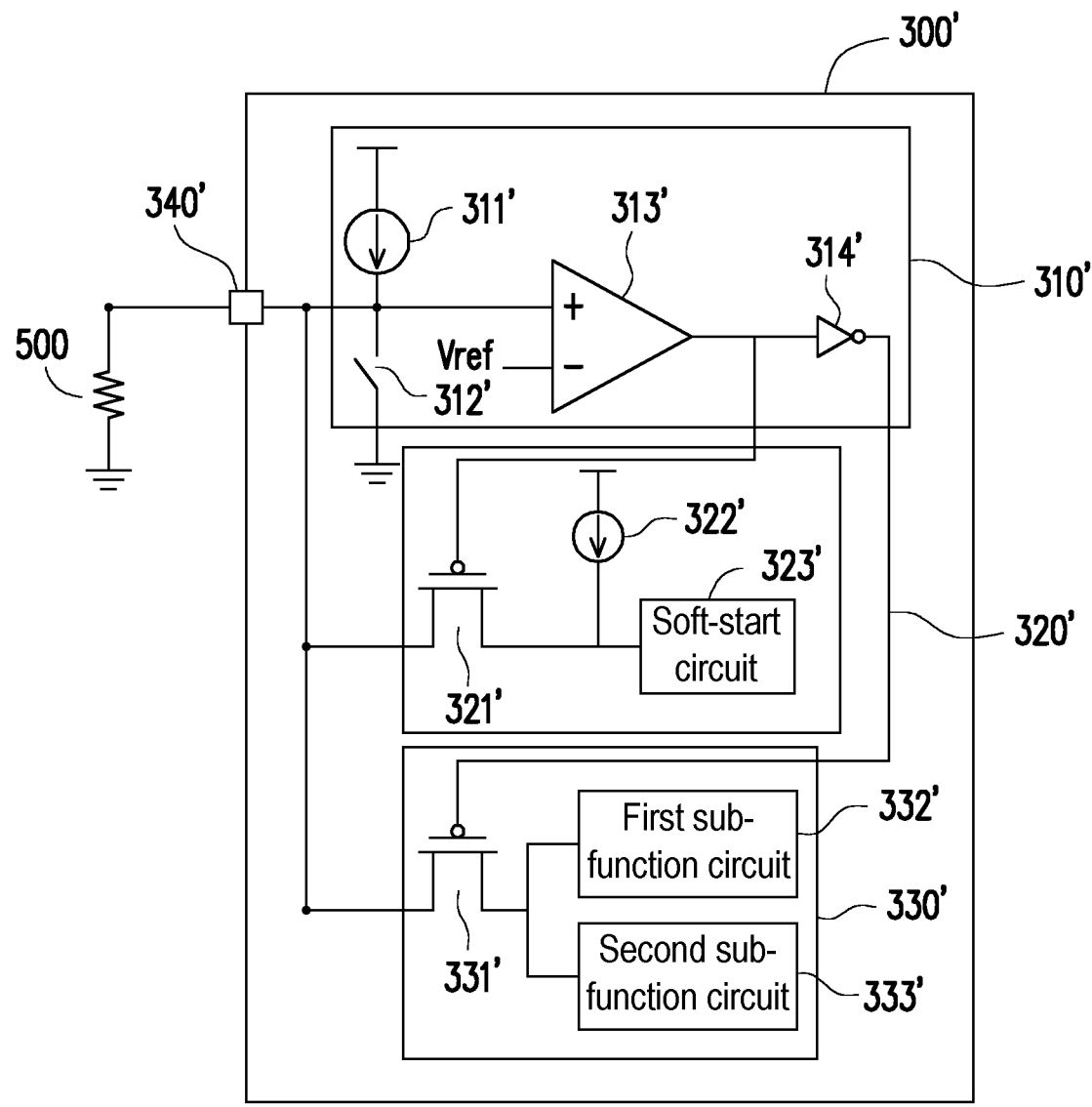
FIG. 3 is a schematic circuit diagram of a power conversion circuit according to another embodiment of the disclosure.

FIG. 3 is a schematic circuit diagram of a power conversion circuit according to another embodiment of the disclosure. Referring to FIG. 3 and FIG. 4, compared to the embodiment of FIG. 2 described above, in another embodiment, a resistor 500 is used as the external setting circuit, and the power conversion circuit 300' is coupled to the resistor 500 through a multi-function pin 340'. Please refer to both FIG. 3 and FIG. 4. FIG. 4 includes signal waveform changes when the capacitor 500 is used as the external setting circuit. In the present embodiment, before time t1, a transistor switch 312' of a judging circuit 310' is turned on to discharge the multi-function pin 340'. Between time t1 and time t2, the transistor switch 312' is turned off and is not conductive. The current source 311' of the judging circuit 310' may provide the setting current (also called the pulse current) Iset to the multi-function pin 340'. Then, after the resistor 500 receives the setting current Iset through the multi-function pin 340', a corresponding voltage Vset_R is generated at the multi-function pin 340', an inverting input end of the comparator 313' receives the voltage Vset_R, and the resistor 500 generates a corresponding fixed voltage as shown in FIG. 4 in response to the setting current Iset having a fixed current value. However, since a specific resistor value may be selected for the resistor 500 by a user so that the voltage Vset_R provided by the resistor 500 is higher than the reference voltage Vref, the output end of the comparator 313' outputs the output comparison signal Vc_R with a high voltage level to the control end of the transistor switch 321' of the first function circuit 320', so as to turn off the transistor switch 321'. Also, after inverting the comparison signal via the inverter 314', the output end of the inverter 314' outputs another comparison signal with a low voltage level to the control end of the transistor switch 331' of the second function circuit 330', so as to turn off the transistor switch 331'.

At time t3, since the transistor switch 331' of the second function circuit 330' is turned on, the first sub-function circuit 332' and the second sub-function circuit 333' of the second function circuit 330' are enabled. Between time t3 and time t4, the first sub-function circuit 332' performs soft-start of the power conversion circuit 300' according to built-in settings. And, between time t5 and time t6, the second sub-function circuit 333' provides a second reference current Iref2 to the multi-function pin 340', so that the resistor 500 generates the corresponding voltage Vset_R according to the second reference current Iref2. Therefore, as shown in FIG. 4, between time t5 and time t6, the voltage Vset_R is a fixed voltage, and the power conversion circuit 300' can perform a multi-functional setting according to the voltage Vset_R. Accordingly, in the present embodiment, the power conversion circuit 300' can automatically decide that the external setting circuit is the resistor 500, and execute the corresponding soft-start and the multi-function setting.

FIG. 5 is a flowchart of a multi-function setting method according to an embodiment of the disclosure. Please refer to FIG. 1 and FIG. 5. The multi-function setting method provided in the present embodiment may be applied to at least the power conversion circuit 100 of the embodiment of FIG. 1 so that the power conversion circuit 100 executes the following steps S610 and S620. In step S610, the judging circuit 110 of the power conversion circuit 100 provides a setting current to the multi-function pin 140, so that the external setting circuit 200 generates a voltage according to the setting current. In step S620, the power conversion circuit 100 judges the type of the external setting circuit 200 according to the voltage signal, so as to activate the first function circuit 120 or the second function circuit 130 accordingly. Therefore, according to the multi-function setting method provided in the present embodiment, the power conversion circuit 100 can automatically execute the corresponding function according to the type of the external setting circuit 200.

In addition, the multi-function setting method and other implementations, technical details, and component features of the power conversion circuit 100 of the present embodiment can be found in the description of the embodiments in FIG. 1 to FIG. 4, and are not repeated here.

In summary, the power conversion circuit and the multi-function setting method provided by the disclosure can be applied to the case where the external setting circuit is a capacitor or a resistor. According to the power conversion circuit and the multi-function setting method provided by the disclosure, by providing the current to the external setting circuit, the power conversion circuit can effectively decide whether the external setting circuit is a capacitor or a resistor according to the voltage returned by the external setting circuit, and then perform soft-start, a soft-start setting or other multi-function settings. In other words, according to the power conversion circuit and the multi-function setting method of the disclosure, the power conversion circuit can perform the corresponding function setting of the power conversion circuit after automatically judging the type of external setting circuit designed by the user.

Finally, it should be noted that the above embodiments are only used to illustrate, not to limit, the technical solution of the disclosure. Although the disclosure has been described in detail with reference to the above embodiments, those of ordinary skill in the art should understand that they can still modify the technical solutions described in the foregoing embodiments, or equivalently replace some or all of the technical features while the modifications or substitutions do not deviate from the scope of the technical solutions of the embodiments of the disclosure.

What is claimed is:

1. A power conversion circuit with a multi-function pin, the multi-function pin coupled to an external setting circuit, wherein the power conversion circuit comprises:
   a first function circuit coupled to the multi-function pin;
   a second function circuit coupled to the multi-function pin; and
   a judging circuit coupled to the multi-function pin, the first function circuit, and the second function circuit, and providing a setting current to the multi-function pin so that the external setting circuit generates a voltage according to the setting current,
   wherein the judging circuit judges the type of the external setting circuit according to the voltage, so as to activate the first function circuit or the second function circuit accordingly.

2. The power conversion circuit according to claim 1, wherein the external setting circuit is one of a resistor or a capacitor.

3. The power conversion circuit according to claim 1, wherein the setting current continues for a first time and generates the voltage at the multi-function pin at the end of the first time during a soft-start period.

4. The power conversion circuit according to claim 1, wherein the first function circuit comprises:
   a first current source coupled to the multi-function pin; and
   a soft-start circuit coupled to the multi-function pin, wherein the judging circuit activates the first function circuit when judging that the external setting circuit is a capacitor, so that the first current source provides a first reference current to the multi-function pin, the external setting circuit generates a soft-start voltage according to the first reference current to be provided to the soft-start circuit through the multi-function pin, and the soft-start circuit performs soft-start according to the soft-start voltage.

5. The power conversion circuit according to claim 1, wherein the second function circuit comprises:
   a first sub-function circuit coupled to the multi-function pin; and
   a second sub-function circuit coupled to the multi-function pin,
   wherein the judging circuit activates the second function circuit when judging that the external setting circuit is a resistor, so that the first sub-function circuit performs a soft-start setting, the second sub-function circuit provides a second reference current to the multi-function pin, and the external setting circuit generates a setting voltage according to the second reference current, so that the power conversion circuit performs a multi-function setting according to the setting voltage.

6. The power conversion circuit according to claim 1, wherein the judging circuit comprises:
   a second current source coupled to the multi-function pin and configured to provide the setting current; and
   a comparator, wherein a non-inverting input end of the comparator is coupled to the multi-function pin, an inverting input end of the comparator is coupled to a reference voltage, and an output end of the comparator is coupled to the first function circuit and the second function circuit,
   wherein the second current source outputs the setting current to the multi-function pin during a judging period, so that the external setting circuit provides the voltage to the multi-function pin according to the setting current, and the comparator compares the voltage and the reference voltage so as to output a comparison signal.

7. A multi-function setting method for a power conversion circuit having a multi-function pin coupled to an external setting circuit, wherein the multi-function setting method comprises:
   providing a setting current to the multi-function pin, so that the external setting circuit generates a voltage according to the setting current; and
   judging the type of the external setting circuit according to the voltage to activate a first function circuit or a second function circuit accordingly.

8. The multi-function setting method according to claim 7, wherein in a step of providing the setting current to the multi-function pin, the setting current continues for a first time, and the voltage is compared with a reference voltage at the end of the first time.

9. The multi-function setting method according to claim 7, wherein a step of judging the type of the external setting circuit according to the voltage so as to correspondingly activate the first function circuit or the second function circuit comprises:
   activating the first function circuit when the external setting circuit is judged to be a capacitor, so that the first function circuit provides a first reference current to the multi-function pin; and
   generating a soft-start voltage according to the first reference current through the external setting circuit so as to perform soft-start according to the soft-start voltage.

10. The multi-function setting method according to claim 7, wherein a step of judging the type of the external setting circuit according to the voltage so as to correspondingly activate the first function circuit or the second function circuit comprises:
- activating the second function circuit when the external setting circuit is judged to be a resistor, so that a first sub-function circuit of the second function circuit performs a soft-start setting, and a second sub-function circuit of the second function circuit provides a second reference current to the multi-function pin; and
- generating a setting voltage according to the second reference current through the external setting circuit, wherein the power conversion circuit performs a multi-function setting according to the setting voltage.

* * * * *